Figure 1:
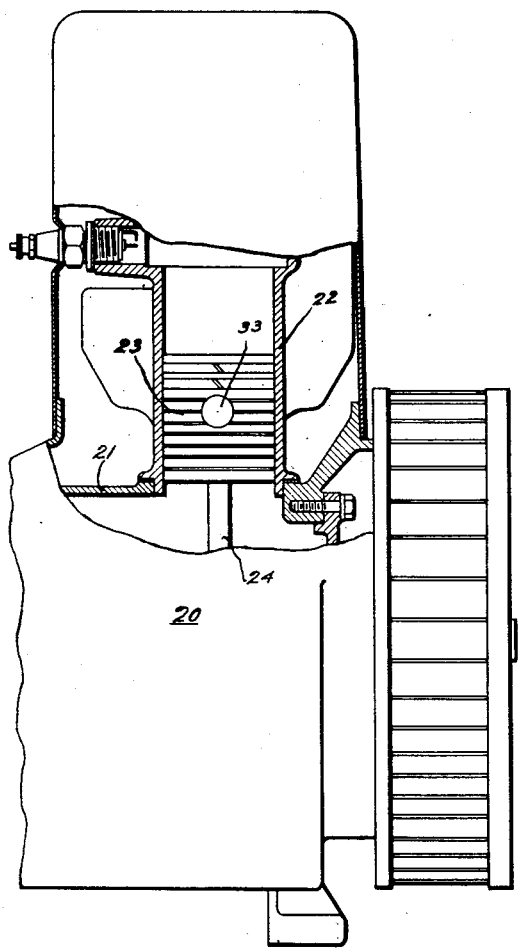

July 16, 1929.　　　　C. S. BROWN　　　　1,720,779
ENGINE
Original Filed April 18, 1923

Inventor
Charles S. Brown
By Spencer Hardman + Fehr
Attorney

Patented July 16, 1929.

1,720,779

UNITED STATES PATENT OFFICE.

CHARLES S. BROWN, OF DAYTON, OHIO.

ENGINE.

Original application filed April 18, 1923, Serial No. 632,958. Divided and this application filed November 18, 1926. Serial No. 149,148.

This invention relates to the art of fitting one body into a cavity provided by another body and aims to provide an improved method of securing either a press fit or a sliding fit wherein relative movement may take place between the surfaces of the bodies, by means of which it is possible to fit bodies together in a closer relationship than heretofore.

The invention is particularly adapted for fitting a cylindrical body within a cylindrical cavity in another body, and particularly for fitting a piston within an engine cylinder, more closely than heretofore possible without danger of scoring the cylinder during the operation of the engine.

A further object of the invention is to provide a piston which can be fitted more closely than heretofore possible within the cylinder of an engine, and will automatically shape itself to conform to the cylinder wall without scoring the cylinder while the engine is running.

A further object is to provide a piston which will tend to remove carbon and other foreign particles from the cylinder walls, and which will tend to conserve lubricating oil while also tending to distribute an adequate supply of oil over the cylinder wall.

Further objects and advantages of the present invention will be apparent from the following description, reference being had to the accompanying drawing, wherein a preferred embodiment of one form of the present invention is clearly shown.

Figure 2:
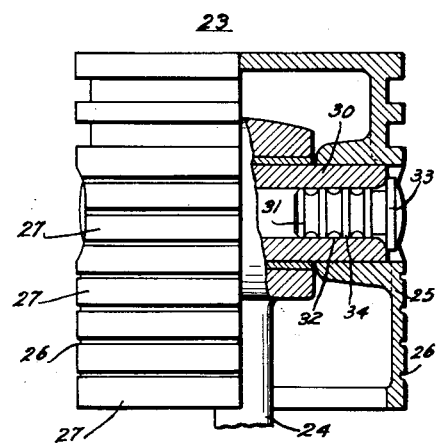

In the drawings:

Fig. 1 is a fragmentary view of an air cooled engine certain parts being shown in section to show the construction of a piston embodying the present invention; and Fig. 2 is a side view of the piston, one half thereof being shown in section.

The present invention provides a mode of fitting bodies together which involves providing the surface of one of the bodies with elevated and depressed portions, the elevated portions being initially greater in certain dimensions than the desired surfaces of contact of the body. Then the bodies are placed together and one is moved relative to the other, the surface being pressed together, and some of the material is removed from the elevated portions by a shearing, abrading or deforming action, the excess material being collected in the depressed portions. The elevated surfaces are preferably relatively narrow in the direction of the relative motion of the surfaces so that when one body is turned or moved by sliding motion, material will be easily removed from the elevated surfaces rather than from the surface of the other body.

The use of the present invention to fit a piston within an engine cylinder will first be described. An engine 20 is provided with a crank case 21 supporting a cylinder 22 within which a piston 23 is adapted to reciprocate. Piston 23 supports a wrist pin 30 attached to a connecting rod 24. In order to make the piston self-adaptable in size and shape to the interior wall of the engine cylinder, the skirt of the piston includes portions engageable with the cylinder wall and capable of being worked down and reduced in diameter, and includes provisions for receiving the metal of the distortable portions so as to permit reduction in diameter of the piston. In other words, these provisions receive the surplus metal which would tend to collect between the cylinder and piston or any other material which if allowed to remain along the surfaces of contact would cause the piston to stick within the cylinder and to score the cylinder walls. These material-receiving provisions include a plurality of annular grooves 26 provided in the skirt portion 25 of the piston 23. The grooves are spaced relatively close together so as to provide a plurality of relatively narrow annular deformable surfaces 27 for engagement with the cylinder wall. For a 2-1/2 inch piston the preferred spacing of the grooves is 1/4 inch, and the grooves are 1/16 inch wide and from five to ten thousandths of an inch deep.

Where an aluminum piston is used in cooperation with a cast iron cylinder, it has been necessary heretofore to provide a relatively large clearance between the piston skirt and the cylinder wall in order that, due to the difference in expansion of the cylinder and piston, the piston will not stick within the cylinder when the engine is heated by its operation. For example, it has been the practice to provide for an aluminum piston 2-1/2 inches in diameter a clearance ranging from seven to nine thousandths of an inch in order that during the operation of the engine some portion of the piston will not bind against the cylinder wall and break the oil film at that point and thus cause the material of the piston to stick or to adhere to the cylinder walls and to be rubbed between the piston and the cylinder causing both members to be damaged.

By the use of the present invention it is possible to use only five thousandths of an inch clearance for a 2-1/2 inch aluminum piston, when the engine is cold. The engine is operated and the progressive heating of piston will cause portions of the annular surfaces 27 to bind progressively against the cylinder walls and break the oil film in places. Some of the metal of the piston may be rubbed off from the skirt due to the tendency of the piston to stick but this metal will be burred over into the grooves to permit the contacting portion of the skirt to be reduced in dimensions so that a necessary clearance will be automatically obtained by a progressive rubbing or deforming action as the piston is heated. In other words a piston automatically adapts itself to the cylinder walls by the burring over of portions of the annular surfaces into the grooves 26. Finally the piston wears itself into shape allowing the proper clearance for the oil to be distributed along the cylinder walls. No preliminary lapping of the piston to the cylinder is necessary. The piston will simply shape itself properly while the engine is running.

It has been observed that the scoring of the cylinder walls results from the surfaces of the piston and cylinder being so close as to break the oil film. Then scoring begins because one surface tends to adhere to the other. Although scoring may tend to take place in an engine constructed in accordance with the present invention, yet the material receiving grooves 26 receive the material which is removed from the adhering surfaces and therefore the cause for scoring is removed as rapidly as it tends to exist.

The grooves 26 also receive any carbon which may collect on the surfaces 27, and also grit or other foreign particles present in the lubricating oil which may collect on the walls of the cylinder and would tend to impair lubrication or damage the cylinder walls. The carbon collecting in the grooves has a lubricating effect and therefore the amount of lubricating oil necessary for the pistons can be reduced.

It will also be apparent that the reduction in clearance between the piston and cylinder will result in the reduction of the amount of oil entering between these bodies thereby resulting in a material saving in lubricating oil. The oil is trapped to some extent in the grooves and is spread out from the grooves upon the cylinder walls as needed. The edges of the surfaces 27 providing the corners of the grooves 26 are slightly blunted or rounded to prevent the portions 27 from scraping too much oil from the cylinder wall and so that the portions 27 tend to spread the oil rather than to scrape it from the cylinder wall.

It is apparent from the foregoing that among the advantages of the present invention are the following; the piston can be fitted more closely than heretofore without danger of scoring and therefore the efficiency of an engine can be materially increased since the desired compression can be maintained and there will be less fuel leaking past the piston. The engine will operate with less noise because of the reduction in piston slap. There will be a reduction in lubricating oil consumption, and there will be less carbon to be removed from the cylinder walls.

The present invention is not limited in its application to the fitting of an aluminum piston or to any other piston having a co-efficient of expansion greater than that of the material of the cylinder. The present invention may be applied to fitting a cast iron piston within an engine cylinder. For example, it has been the practice to provide from .003 to .005 inch clearance for a 2-1/2 inch cast iron piston. By using the present invention the piston clearance can be reduced to .002 inch resulting in advantages which have been already described. The iron piston will tend to expand slightly relative to the iron cylinder owing to a difference in temperature between the piston and cylinder. Therefore the progressive wearing in action is present as in the case of the aluminum piston.

The present invention is not limited in its application to fitting two bodies to provide a close sliding fit but is adapted for providing a tight press fit. One application of the process to a press fitting operation is shown in Fig. 2. A wrist pin 30 having a cylindrical bore is provided with plugs 31 terminating at the outer end with a cap or button 33. The plug 31 is provided with closely spaced grooves 32 to provide spaced annular contacting surfaces 34. The external diameter may be a few thousandths larger than the internal diameter of the pin 30. On driving the plug 31 into the wrist pin 30 the excess material at the surfaces 34 will be burred over into the grooves 32. In this manner the plug 31 adapts itself to fit automatically within the pin 30 as the plug is driven into the pin. The plug 31 is preferably constructed of a metal which is softer than the cylinder walls so that should the pin 30 shift axially its ends can not come into contact with the cylinder wall, because of the buttons 33 of the plugs; and at the same time the interior of the cylinder will not be scored because the said heads or buttons are softer than the material of the cylinder wall. If any material should be scraped off from the buttons 33 by reason of the contact with cylinder walls it will soon be collected by grooves 26 of the piston.

As explained heretofore, the fitting of two bodies for movement one relatively to the other may take place progressively by gradually expanding one of the bodies relatively to the other.

The clearances between a cylinder and piston greater than 2-1/2 inches in diameter will be commensurately greater than the clearances mentioned. For each inch increase in diameter above 2-1/2 inches, the clearance is preferably increased one thousandth of an inch for a cast iron piston. Obviously the clearance for an aluminum piston should be increased by a greater amount.

I do not herein claim the method of fitting one body within another, this method being claimed in my application Serial No. 632,958, filed April 18, 1923, of which the present application is a division.

While the form of mechanism herein shown and described constitutes a preferred embodiment of one form of the invention, it is to be understood that other forms might be adopted and various changes made therein without departing from the spirit and scope of the invention.

What is claimed is as follows:

1. In an engine, in combination, a member having a cylindrical bore and an integral cylindrical member having a tight fit in the bore and provided with a plurality of relatively elevated and depressed portions, the fit between the members being so close and the elevated portions being so constituted that some of the material thereof can be moved into the spaces of the depressed portions by sliding contact with the wall of the bore.

2. Apparatus described in claim 1, wherein the cylindrical member is of softer material than the member having the cylindrical bore.

3. In an engine, in combination, a member having a cylindrical bore and an integral cylindrical member having a tight fit in the bore and provided with a plurality of relatively elevated and depressed portions, the fit between the members being so close and the elevated portions being so constituted that some of the material thereof can be flowed into the spaces of the depressed portions by sliding contact with the wall of the bore.

4. In an engine, in combination, a member having a cylindrical bore and an integral cylindrical member having a tight fit in the bore and provided with a plurality of relatively elevated and depressed portions, the fit between the members being so close and the elevated portions being so constituted that some of the material thereof can be abraded and collected in the spaces of the depressed portions by contact with the wall of the bore.

5. In an engine, in combination, a cylinder, a piston fitted tightly within the cylinder and provided with a plurality of closely spaced circumferential grooves, the fit between the piston and cylinder being so close and the portions between the grooves being so constituted that some of the material thereof can be flowed and/or abraded into the grooves by sliding contact with the cylinder.

6. In an engine, in combination, a member having a cylindrical bore and an integral cylindrical member having a tight sliding fit in the bore and provided with a plurality of relatively elevated and depressed portions, the fit between the members being so close and the elevated portions being so constituted that some of the material thereof can be moved into the space of the depressed portions by sliding contact with the wall of the bore.

7. Apparatus described in claim 6, wherein the cylindrical member is of softer material than the member having the cylindrical bore.

8. In an engine, in combination, a member having a cylindrical bore and an integral cylindrical member having a tight sliding fit in the bore and provided with a plurality of relatively elevated and depressed portions, the fit between the members being so close and the elevated portions being so constituted that some of the material thereof can be flowed into the spaces of the depressed portions by sliding contact with the wall of the bore.

9. In an engine, in combination, a member having a cylindrical bore and an integral cylindrical member having a tight sliding fit in the bore and provided with a plurality of relatively elevated and depressed portions, the fit between the members being so close and the elevated portions being so constituted that some of the material thereof can be abraded and collected in the spaces of the depressed portions by contact with the wall of the bore.

10. In an engine, in combination, a member having a cylindrical bore and an integral cylindrical member adapted to be inserted into the bore, said cylindrical member being provided with a plurality of lands and grooves on its exterior surface transverse to its axis, the fit between the members being so constituted that some of the material of the lands can be moved into the grooves by sliding contact with the wall of the bore.

In testimony whereof I hereto affix my signature.

CHARLES S. BROWN.